(12) United States Patent
Kadashevich

(10) Patent No.: US 7,886,302 B2
(45) Date of Patent: Feb. 8, 2011

(54) SYSTEM AND METHODS FOR TRACKING PROCESSING UNIT USAGE

(75) Inventor: A. Julie Kadashevich, Tyngsboro, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/609,049

(22) Filed: Oct. 30, 2009

(65) Prior Publication Data

US 2010/0179979 A1 Jul. 15, 2010

Related U.S. Application Data

(63) Continuation of application No. 10/824,065, filed on Apr. 14, 2004, now abandoned.

(51) Int. Cl.
G06F 9/46 (2006.01)
G06F 15/173 (2006.01)
G06F 11/00 (2006.01)
G06F 9/455 (2006.01)

(52) U.S. Cl. .......................... 718/105; 718/1; 718/100; 718/104; 709/223; 709/224; 709/225; 714/1; 714/2; 714/39; 714/47

(58) Field of Classification Search ........................ None
See application file for complete search history.

(56) References Cited

U.S. PATENT DOCUMENTS

| | | | | |
|---|---|---|---|---|
| 5,655,081 A * | 8/1997 | Bonnell et al. | | 709/202 |
| 6,263,358 B1 * | 7/2001 | Lee et al. | | 718/100 |
| 6,330,588 B1 * | 12/2001 | Freeman | | 709/202 |
| 6,560,647 B1 * | 5/2003 | Hafez et al. | | 709/224 |
| 6,691,067 B1 * | 2/2004 | Ding et al. | | 702/186 |
| 6,763,369 B1 * | 7/2004 | Ytuarte et al. | | 709/201 |
| 6,804,630 B2 * | 10/2004 | Lee et al. | | 702/186 |
| 6,871,345 B1 * | 3/2005 | Crow et al. | | 717/175 |
| 7,131,113 B2 * | 10/2006 | Chang et al. | | 717/128 |
| 7,143,392 B2 * | 11/2006 | li et al. | | 717/125 |
| 7,155,715 B1 * | 12/2006 | Cui et al. | | 717/177 |
| 7,218,609 B2 * | 5/2007 | Borella et al. | | 370/230 |
| 7,383,332 B2 * | 6/2008 | Chong et al. | | 709/224 |
| 7,412,354 B2 * | 8/2008 | Lee et al. | | 702/186 |
| 2001/0029526 A1 * | 10/2001 | Yokoyama et al. | | 709/218 |
| 2002/0147759 A1 * | 10/2002 | Ranganathan | | 709/104 |
| 2003/0056200 A1 * | 3/2003 | Li et al. | | 717/128 |
| 2005/0010574 A1 * | 1/2005 | Vaught | | 707/10 |
| 2005/0010667 A1 * | 1/2005 | Moriki et al. | | 709/226 |
| 2005/0010930 A1 * | 1/2005 | Vaught | | 719/318 |
| 2005/0027858 A1 * | 2/2005 | Sloth et al. | | 709/224 |

OTHER PUBLICATIONS

Paolo Bellavista, Antonio Corradi, Cesare Stefanelli; How to Monitor and Control Resource Usage in Mobile Agent Systems; IEEE, 2001, pp. 65-75.*

* cited by examiner

*Primary Examiner*—Li B Zhen
*Assistant Examiner*—Abdullah Al Kawsar
(74) *Attorney, Agent, or Firm*—David A. Dagg

(57) ABSTRACT

A method and system for monitoring the CPU time consumed by a software agent operating in a computer system. A resource tracking process is executed on the system. When an operating agent is detected, an agent lifetime timer is initialized. Then, CPU resources for the agent are identified and stored. Checks are made at predetermined intervals to determine if the agent is still alive. When the agent terminates, a measurement is made of the CPU time utilized by the agent. The measurement is then stored in memory.

25 Claims, 10 Drawing Sheets

| AGENT ID | THREAD PRESENCE | START TIME | END TIME | STATUS | SEVERITY | RESOLUTION |
|---|---|---|---|---|---|---|
| 010 | 0 | | | | | |
| 008 | 1 | | | | | |
| 006 | 0 | | | | | |
| 003 | 0 | | | | | |
| 001 | 0 | | | | | |

FIG. 5A

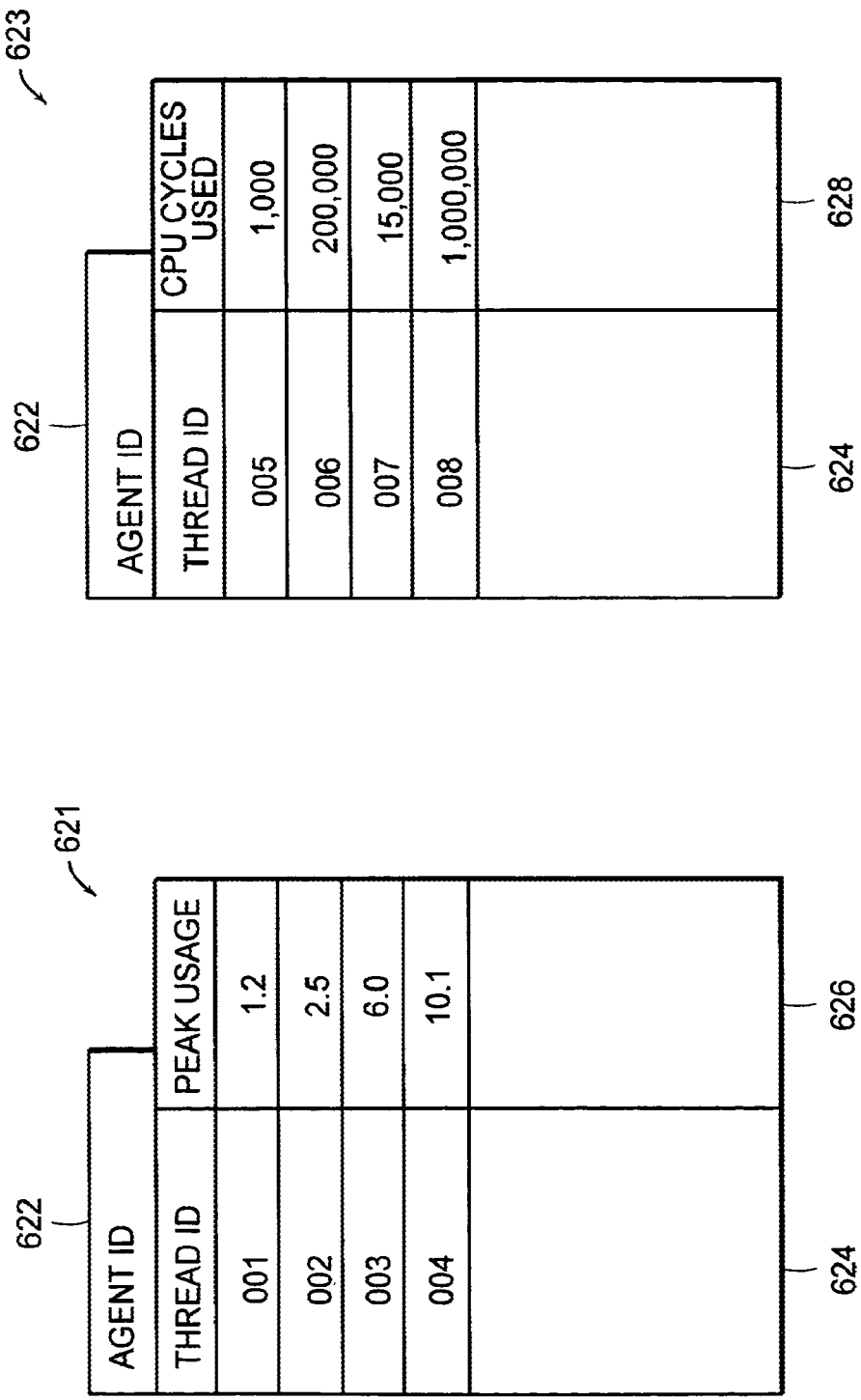

FIG. 6A

New DDM Probe

[Cancel] [Previous] [Next] [Disable this probe]

716 —

Target

718 — Which server(s) should run this probe?
  ⌐Fisheye/Lily ▼

720 — Which process should be probed?
  ⦿ Agent Manager ▼
  ○ HTTP

FIG. 6B

New DDM Probe

[Cancel] [Previous] [Next] [Disable this probe]

716 —

Type

Name: ⌐CPU⌐

Type: Agents ▼

SubType: 
  Agents ranked by CPU usage
  Agent errors and problems
  Agent behind schedule
  Agents ranked by CPU usage
  Agents ranked by memory usage
  Long running agents 722C — Custom:

SYSTEM AND METHODS FOR TRACKING PROCESSING UNIT USAGE

BACKGROUND OF THE INVENTION

Management and workflow collaboration software systems are used by organizations to maintain the efficiency of workforces. Among other things, these systems, herein referred to as enterprise systems, allow employees to communicate, obtain information, requisition products and services, generate documents, and perform online training. Management systems may also connect portions of an organization that are separated geographically. As a result, management systems are often spread across multiple servers coupled to the network. The distributed nature of management systems along with the requirement that they perform numerous operations simultaneously makes them very large and complex.

Adding to the complexity of management systems is the fact that many of these systems have evolved over time. This evolution has largely been driven by customer needs and has resulted in rather basic management systems evolving into the large, complex ones predominant today. In addition, users must be able to write their own applications to extract maximum utility from management systems. The combination of old/new software-executable instructions and customer developed software instructions may produce operating environments that are difficult to troubleshoot. For example, an enterprise system may be executing hundreds or thousands of software agents as a matter of normal operation. A software agent as used herein refers to any self-contained potentially adaptive software application and as such, is an executable sequence of instructions. Software agents can be short lived, i.e. having lifetimes of less than a second, or can be long-lived having lifetimes measured in hours or days. Furthermore, software agents may need to operate according to a schedule. If a particular software agent is not operating at the appropriate time, it may be due to either a problem with the scheduled agent, a problem with an agent currently running, or a problem with software processes that schedule agents. Identifying the exact cause of late agents using the prior art is thus problematic. Software agents may also consume system resources while operating. Examples of resources consumed by agents are, but not limited to, system memory, CPU bandwidth, disk input/output operations, database opens, document creation, and network traffic.

Prior art systems and methods for monitoring agent activity may not easily identify problematic agents because there is no apriori mechanism for identifying when agents may become problematic. Furthermore, prior art tools may not isolate problematic agents.

There exists a need for systems and methods for identifying agents that may become problematic before they actually cause a problem. Furthermore, there exists a need for monitoring system resources consumed by software agents. In addition, there is a need for identifying and rank ordering agents causing problems so that system resources can be adaptively managed.

SUMMARY OF THE INVENTION

The preferred embodiments of the present invention are directed at measuring and monitoring processing unit resources within computing environments. These environments include, without limitation, Agent Manager and hypertext transfer protocols (HTTP). In accordance with an aspect of the invention, a method for monitoring system processor time of a software agent operating in a computer system is provided. The method comprises identifying the agent by associating an agent identifier with it. Then, an operating interval associated with the agent is determined and monitored using an agent lifetime timer. Next, the operating interval and agent identifier are stored in a computer-readable memory.

In accordance with another aspect of the invention, a method for monitoring system processor usage, for example, as time by an agent, having an agent lifetime, which is associated with a thread, having a thread lifetime, is provided. In this method, an agent identifier is associated with the agent. An agent lifetime timer is initiated for monitoring the agent lifetime. System processor resource allocations for the agent are then determined that are used to define a footprint which can be defined as the maximum memory allocation for the agent. The footprint for the agent includes an amount of system processor resources utilized by the agent thread during its lifetime and an amount of system processor resources utilized by all the threads during the agent lifetime. In a preferred embodiment, the method then includes the step of associating the footprint with the agent identifier, storing the footprint and agent identifier in a computer-readable memory, comparing the agent's footprint to footprints associated with other software agents operating in the system, ranking the footprint of the agent against the other software agents' footprints, and displaying the footprints exceeding a predefined threshold.

In accordance with yet another aspect of the invention, a computer program product having machine-readable instructions disposed thereon for instructing a processor to perform a method for monitoring system processor time for a software agent operating in a computer system is provided. The computer program product includes instructions for initiating an agent lifetime timer for monitoring an operating interval associated with the agent, instructions for determining system processor resource allocations associated with the agent, instructions for storing the operating interval and resource allocations associated with the agent, and instructions for notifying a system operator about operating interval and resource allocations.

In accordance with still another aspect of the invention, an apparatus for tracking system processor usage time by a software agent operating in a computer system is provided. The apparatus includes a processor having executable instructions for identifying the agent by associating an agent identifier therewith, executable instructions for initiating an agent lifetime timer for monitoring an operating interval of the agent, executable instructions for determining the operating interval using the lifetime timer and executable instructions for string the operating interval and the agent identifier in a computer-readable memory having a hash table associated therewith.

In accordance with still another aspect of the invention, a method for tracking system processor time for a target agent associated with a Hyper Text Transfer Protocol (HTTP) process running a plurality of threads in a computer is provided. In a preferred embodiment, the method includes the target agent is operating with at least one of the threads. A computer-readable hash table is created in a memory associated with the computer system. An agent tracking function is initiated in machine-executable sequence of instructions on the system. Next, members of the plurality of threads are identified by associating a thread identifier with each member of the plurality of threads. Those of the plurality of identified threads having the target agent operating therewith are identified. Then, the amount of system processor time utilized by the identified threads is determined and stored in the hash table.

In preferred embodiments, processing unit resource consumption can be tracked on two levels. First, the overall CPU consumption is tracked. When the CPU utilization for the process becomes high, an individual agent's CPU consumption is tracked. Tracking the overall usage determines when the usage is high, while the second determines which agent(s) are causing the problem.

The foregoing and other features and advantages of the system and method for monitoring CPU usage associated with software agents will be apparent from the following more particular description of preferred embodiments of the system and method as illustrated in the accompanying drawings in which like reference characters refer to the same parts throughout the different views.

The drawings are not necessarily to scale, emphasis instead being placed upon illustrating the principles of the invention.

BRIEF DESCRIPTION OF THE DRAWINGS

FIGS. 5A-5C illustrate exemplary data structures for representing agent data and agent thread data in a computer-readable memory in accordance with a preferred embodiment of the present invention; and FIGS. 6A-6C illustrate exemplary user interfaces for providing agent data and agent thread data to a user in accordance with a preferred embodiment of the present invention.

DETAILED DESCRIPTION OF THE INVENTION

Figure 1:
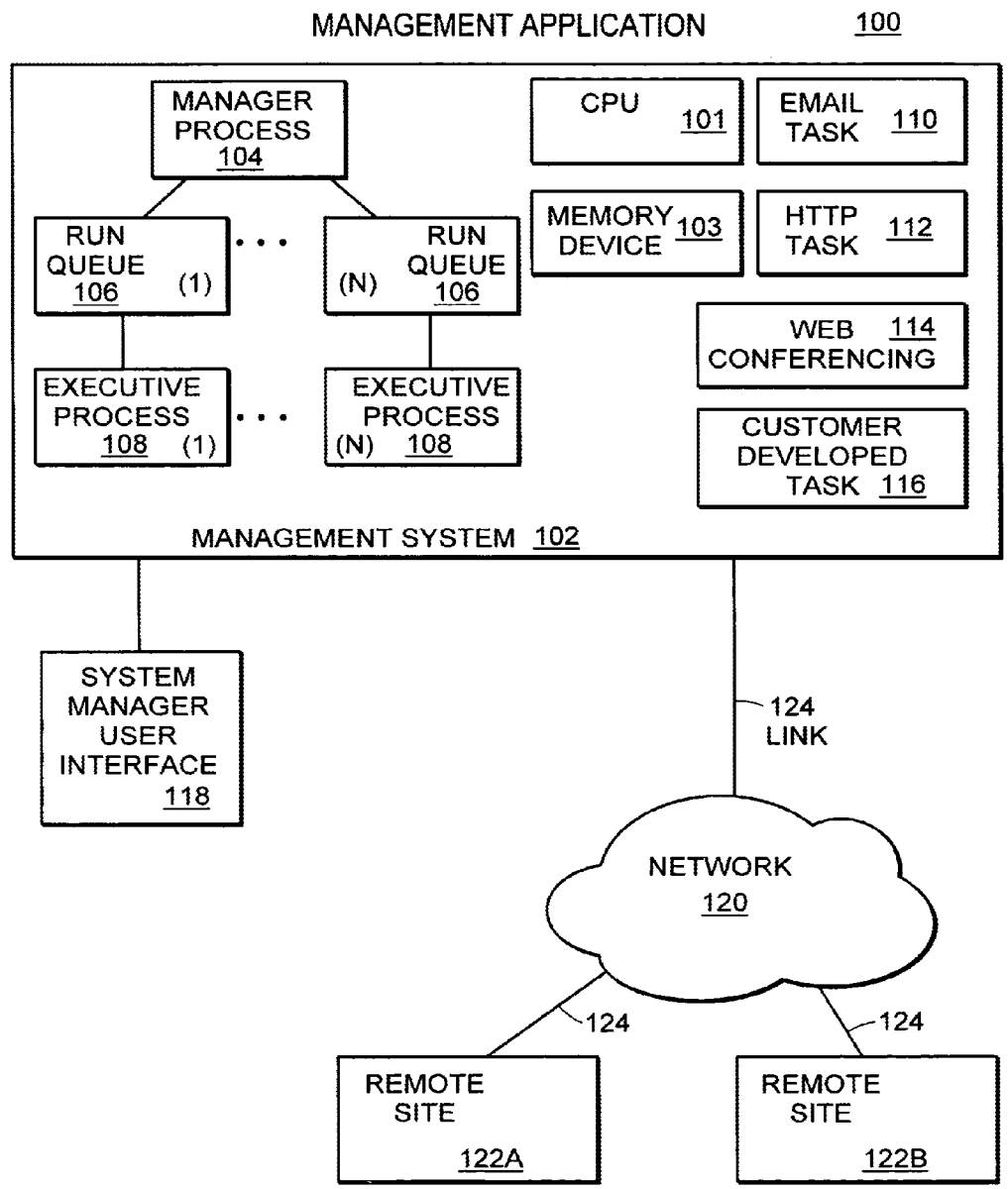
FIG. 1 illustrates an exemplary management system consistent with preferred embodiments of the present invention.

Management systems such as, for example, enterprise systems handle, without limitation, electronic mail (email) receipt and distribution, access and management to intranet and Internet web sites, management of internal databases, multimedia conferencing, and online calendaring and appointment management. In addition, enterprise systems handle many other functions necessary to assist large and small organizations in operating efficiently. Management enterprise systems rely heavily on the use of software agents for managing the workflow. Agents can be generated by the enterprise system itself or by users and can typically include two types, scheduled or event driven agents. Scheduled agents are those having a defined start time. In addition, scheduled agents may have a predetermined stop time or the stop time can be dictated by an event such as, for example, but not limited to, receipt of an interrupt or the start of another agent. In contrast, event driven agents are initiated upon the occurrence of a particular event rather than at a certain time. Examples of event driven agents are, but not limited to, document creation agents, document closing agents, database opening agents, user logon processing agents, email agents activated upon receipt of a message, and web based agents.

For web based event driven agents, the most common class may be those associated with hypertext transport protocol (HTTP) processes. An HTTP process has a plurality of agent threads associated therewith, and in a preferred embodiment, the default number of multiple threads in an HTTP process, without limitation, is forty. Each agent thread has a unique identifier, for example an identification number, referred to as an HTTP thread ID. An HTTP environment can be multi-threaded with each HTTP agent thread running a single agent thus making it possible for a given agent to be running on multiple HTTP threads simultaneously. For example, in a preferred embodiment, forty copies of the same agent can be executed, or run, at the same time. An HTTP thread ID number is associated with the instance of an agent that is executing on the respective thread, thus making it possible to identify with which copy of an agent a given set of activities are associated. For example, identifying instances of agents using HTTP thread ID's makes it possible to determine when a specific instance of an agent started and/or ended. In the above example, a reference to the instance of the agent, such as an agent ID, consists of the agent's name along with the HTTP thread ID associated with the agent. In addition, a database entry or other parameter may be associated with the agent name and HTTP thread ID to uniquely identify and to further provide details about the agent. As used herein, a thread is a program path of execution, and multi-threaded means that multiple lines of a single program can be executed simultaneously. When agents are running on multiple threads, the operating system may treat each agent thread as a separate and distinct process.

When numerous agents are running simultaneously, problems can occur when one or more agents fail to operate as intended. Problematic agents can be associated with the management enterprise system itself or with user generated agents. Agents in the management system computing environment may become problematic when a new software release is implemented because of, without limitation, incompatibilities with system interfaces or user generated agents and an inability to identify a particular agent when attempting to diagnose system abnormalities. User generated agents may be problematic due to incompatibilities with operating system components; a developer's failure to understand the functionality of developed agents, security misconfigurations associated with developed agents, faulty parameters associated with developed agents, etc.

Agent failures can take many forms, however, certain failures tend to be more prevalent. Examples of common agent failures are, but are not limited to, mismanagement of system memory by agents, excessive central processing unit (CPU) usage, spawning of too many sub processes or agent threads, running longer than expected, failing to execute at the proper time, entering an infinite loop, and mis-applied/misused security settings. The preferred embodiments of the present invention address agents that consume too much CPU time.

FIG. 1 illustrates an exemplary embodiment of a management system for example an enterprise management system, in accordance with the invention. The management application 100 includes management computing system 102 which includes a central processing unit (CPU) 101, a memory device 103, a manager process 104, a run queue 106, an executive process 108, an email task 110, an HTTP task 112, a web conferencing task 114, a customer developed task 116, and a system manager user interface (UI) 118. The management application 100 also includes network 120, remote site 122A and 122B, and links 124. The management computing system 102 may be executing on one or more servers within a corporation, university, governmental agency, or the like. Processes running in management computing system 102 consume CPU resources provided by CPU 101. CPU 101 is comprised of one or more processors executing machine-readable instructions obtained, at least in part, from memory device 103. Consumption is based on usage of CPU clock cycles for executing machine-readable instructions when performing functions associated with software-enabled processes. In addition, processes consume memory, for example, but not limited to, hold variables, generated data, and pointers. Properly operating agents should release memory when they die or end, so that other agents can make use of the newly freed memory. However, when agents do not cease operation correctly, they often fail to release blocked memory, thus adversely impacting system resources.

The manager process 104 oversees management of software agent activity within a management application 100. In particular, the manager process 104 operates in connection with a plurality of executive processes 108 and a run queue 106. When an agent is scheduled to run, the manager process 104 places it in run queue 106. When an executive process 108 is free, the manager process 104 instructs the executive process 108 to begin processing the scheduled agent. When the executive process 108 begins operating on an agent, the agent becomes a running agent for the duration of time it is associated with executive process 108. When an agent has finished executing, the executive process 108 releases the agent and becomes available for running a new agent.

The management computing system 102 may also include an email task 110. The email task 110 is responsible for handling all incoming and outgoing email. Agents associated with email task 110 may be scheduled agents or event driven agents. Examples of scheduled agents operating in conjunction with email task 110 may be an email checking agent. When launched, a router operating in the software delivers mail and sends an event to an agent manager indicating that new mail has been delivered to a database. If an active agent resides in that database, it is invoked.

The HTTP task 112 may run on management computing system 102. The HTTP task 112 is responsible for processing all HTTP related traffic within the management application 100. The HTTP task 112 may start all threads upon its activation, or startup, in response to HTTP requests received from network 120. HTTP task 112 runs event driven agents which consist of threads. The HTTP task 112 may further start a new agent on any running thread. As previously discussed herein, an HTTP agent in an HTTP process can run on more than one thread. In such an embodiment, knowing only a problematic agent's name is not sufficient for identifying it. Information about the thread running the problematic agent is required to positively identify the agent.

The Web conferencing task 114 is responsible for handling all audio, video and text data associated with collaborative conferencing. The Web conferencing task 114 may interact with the email task 110 and/or the HTTP task 112 when providing web conferencing capabilities to an organization. As a result, the web conferencing task 114 may utilize scheduled and event driven agents.

The customer developed task 116 may include software developed by a user of the management application 100. User developed software may take many forms and may utilize one or more scheduled or event driven agents. An example of user developed task 116 may be an order processing agent. The order processing agent may have an event driven portion that executes when a user opens an online ordering capability. Once the order is entered, a scheduled agent may operate on a predetermined cycle seeking management approvals for the order before sending it to a vendor for fulfillment.

The system manager UI 118 may include a computer display for presenting information to a system administrator. For example, the manager process 104 may detect an improperly running agent and cause a popup window to appear on the system manager UI 118. After viewing the error report, the system administrator can take corrective action.

The network 120 connects management computing system 102 to remote sites 122A and 122B. In many large corporations, there may be a headquarters and a plurality of field offices. In FIG. 1, management computing system 102 may be located within the headquarters building while remote sites 122A and 122B are located in a different city, state or country. Network 120 can be any type of data network such as a local area network (LAN), a metropolitan area network (MAN), or a wide area network (WAN). Furthermore, network 120 may utilize any network protocol, or combination of protocols, such as frame relay, packet switched, Internet protocol (IP), synchronous optical network (Sonet), asynchronous transfer mode (ATM), and the like. Links 124 are used to convey data across network 120 and may be comprised of twisted pair cable, coaxial cable, optical fiber, free-space optical links, radio-frequency (RF) links, or the like.

When executive process 108 begins processing an agent, the agent is referred to as an active, or running, agent. While active, an agent is deemed to be alive. When the agent has finished executing, either normally or via manual termination, it is deemed to be dead, or expired. If the agent is later placed in the holding queue it is referred to as a scheduled agent until it is once again processed by an executive process. 108.

Figure 2:
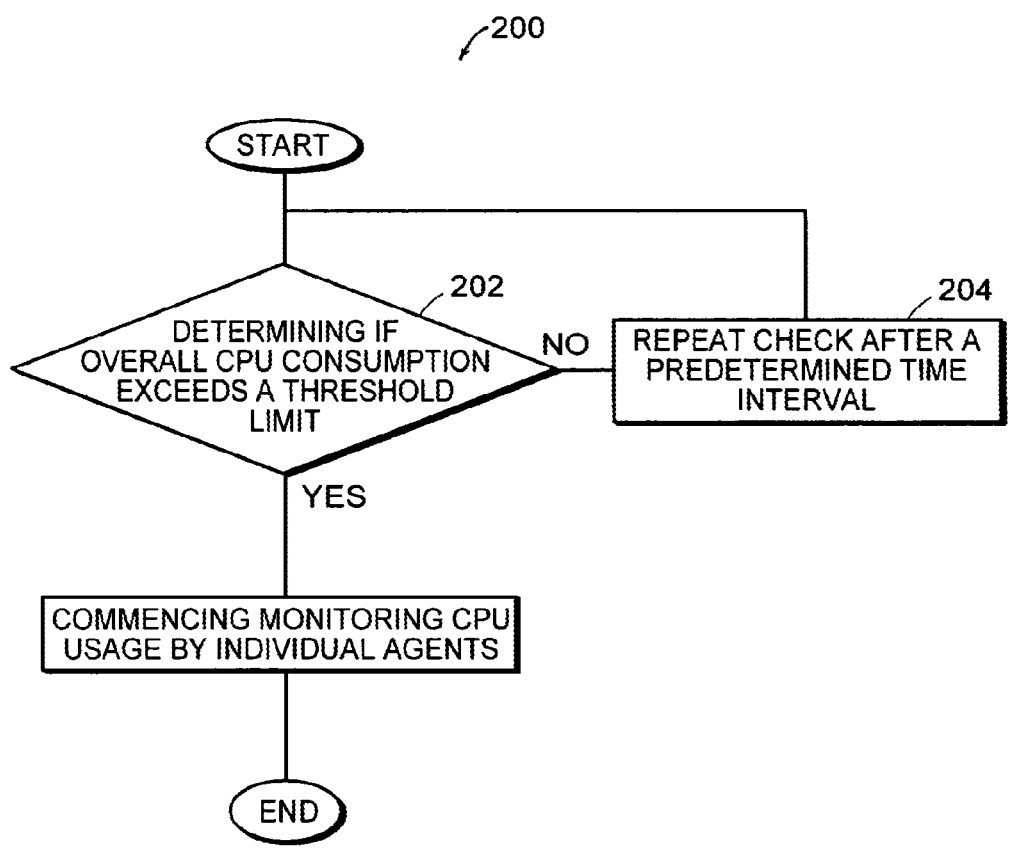
FIG. 2 illustrates a top level flow chart for monitoring CPU usage in accordance with a preferred embodiment of the present invention.

FIG. 2 illustrates a top level flow chart 200 for monitoring CPU usage in accordance with a preferred embodiment of the present invention. A data collection probe can check on a predetermined time interval if the overall CPU consumption exceeds the configuration per step 202. If CPU consumption does not exceed the threshold, step 202 will make subsequent determinations until the threshold is exceeded. In a preferred embodiment, momentary spikes indicative of excessive CPU consumption does not cause concern. However, if the CPU consumption status is at a raised level for a certain predetermined time period, for example, at least 5 minutes, the administrator then begins collecting more data and monitoring usage by individual agents per step 204.

In preferred embodiments, the information about individual agents is collected in a sorted linked list for each thread/process. Information about each agent includes an agent name/database name and CPU time used by the corresponding agent. Periodically the lists generated on different threads/processes are aggregated by an embedded software probe manager. The embedded probe manager caches the collected data for each configuration, filtering or removing agents that are inappropriate. Information about CPU usage is also added to an agent log and is made available to an end user.

Figure 3A:
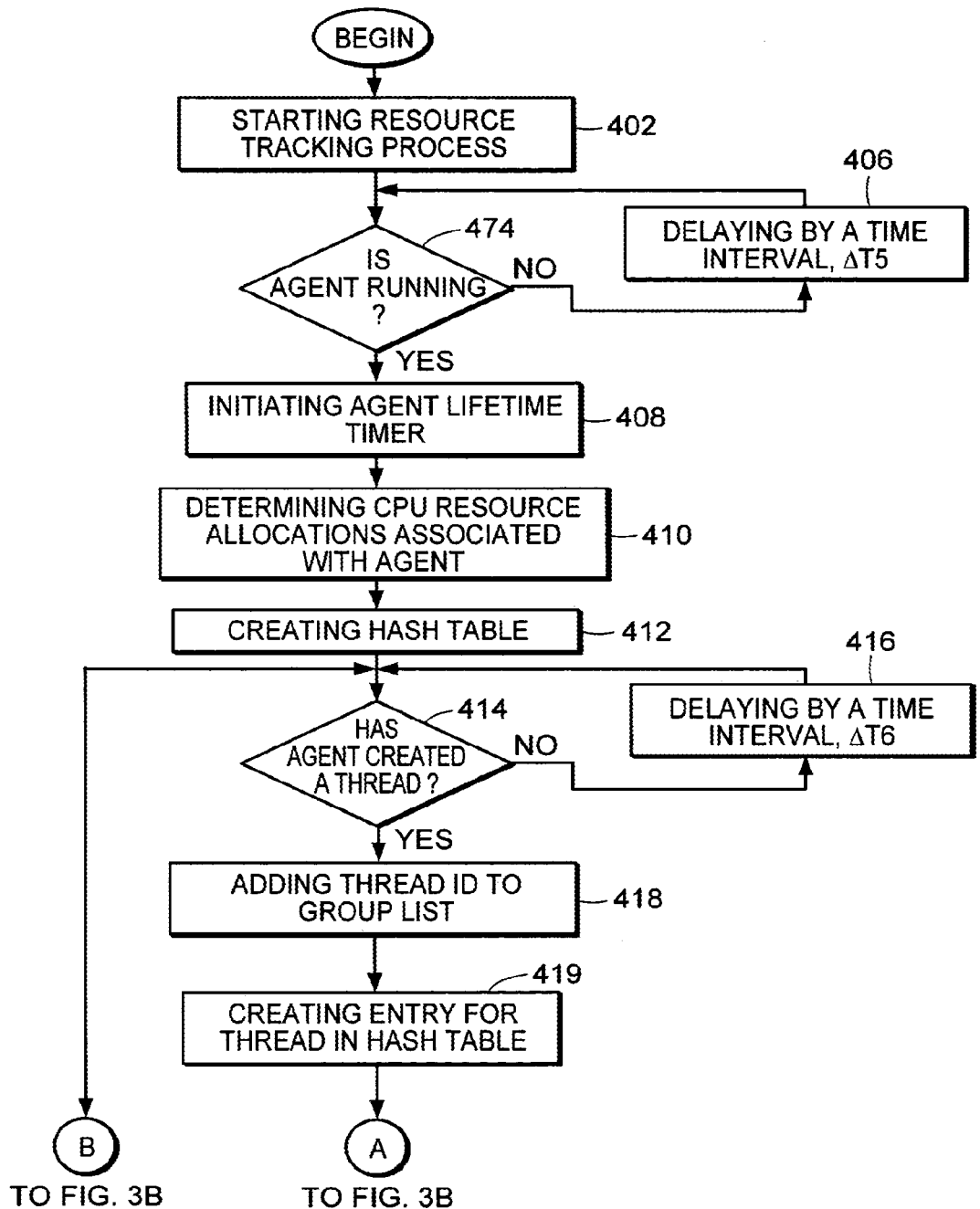
FIG. 3A-3C illustrates flow charts of an exemplary method for measuring and monitoring processing unit, for example, central processing unit (CPU) resources associated with software agents operating in a management system in accordance with an embodiment of the invention.
Figure 3B:
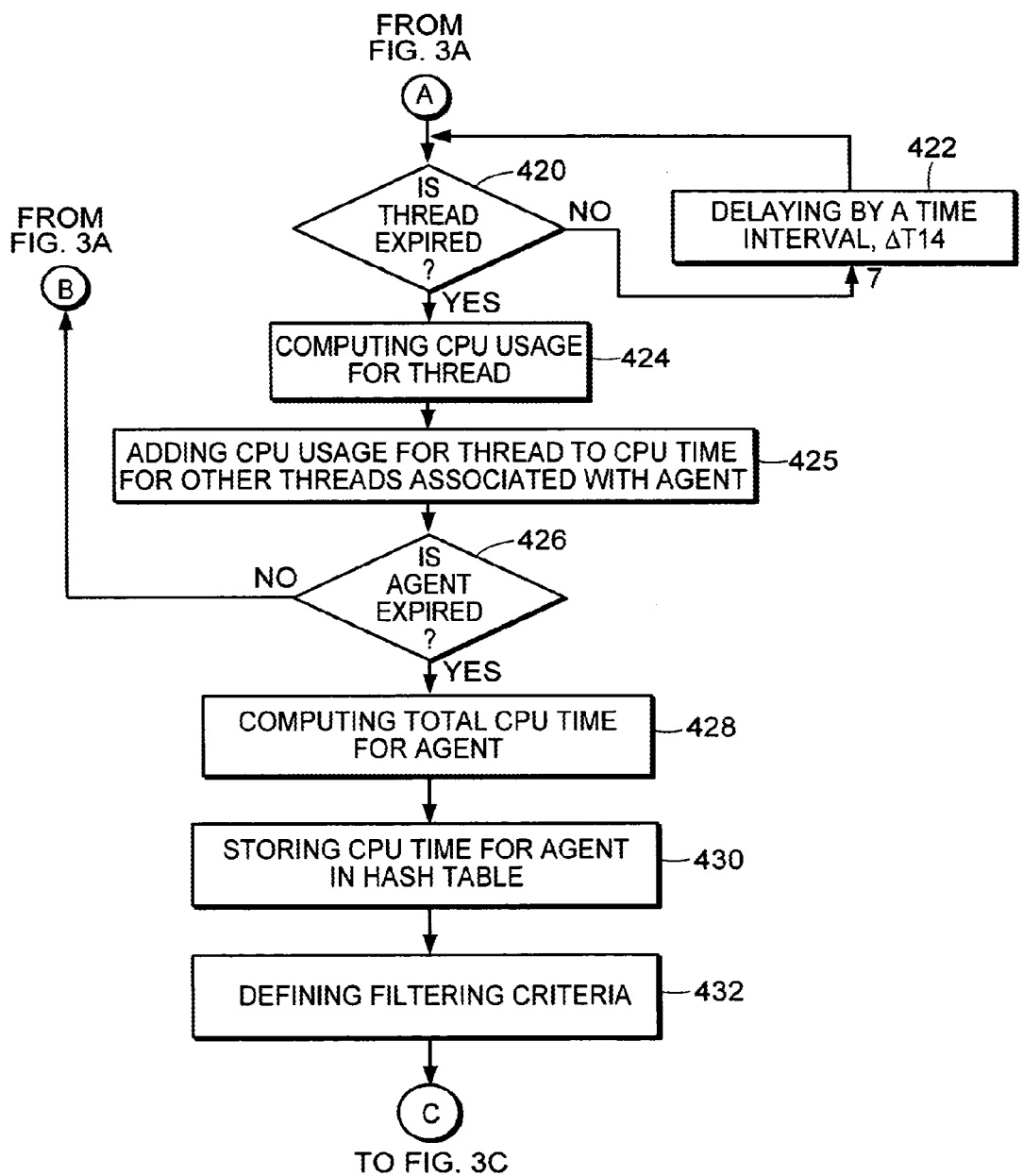
Figure 3C:
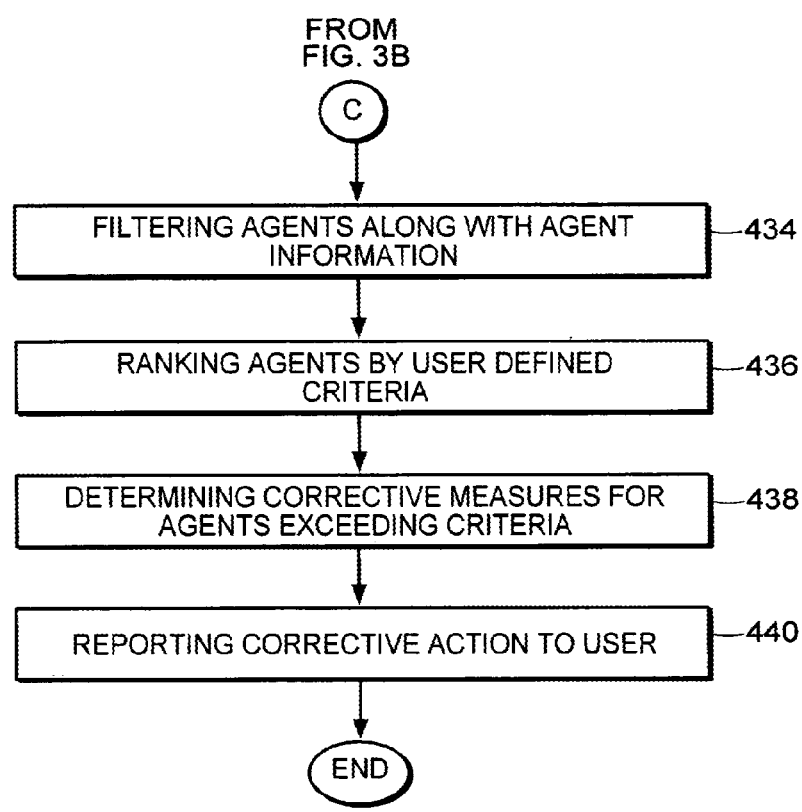

FIGS. 3A-3C illustrate an exemplary method for tracking system processor and in a preferred embodiment CPU, resources utilized by agents executing within system 102. A has table is created per step 401. A hash table is a computer-readable data structure residing in memory which is used for archiving memory usage data associated with each running agent. Specifically, a hash table provides a way of mapping an object, or key, to an associated object, or value. Key refers to the part of a group of data, here information about agents, by which the data can be sorted, indexed, cross referenced, etc. The key is mapped to an array position using a hash function, where array refers to a set of items randomly accessible using a numeric index. Furthermore, the hash function is designed such that a unique key value is mapped to a unique array position. While hash tables can take many forms consistent with embodiments of the invention, a preferred embodiment of the invention uses the thread ID as a key into the hash table. Since a thread ID uniquely identifies a given thread within the system, the key maps to a unique location within the hash table. A CPU resource tracking process including machine-executable instructions is started per step 402. Then, running agents are identified per step 404. If an agent is running, an agent lifetime timer is initiated per step 408. The lifetime timer measures the operating interval for an agent. In contrast, if an agent is not running, the method iterates back to the input of step 404. After step 408, CPU resource allocations associated with the agent are determined per step 410.

Threads created by the running agent are detected per step 414. Next, a thread ID is added to a group list per step 418. Then an entry for the thread is created in the hash table per step 419. After step 419, the method is shown in FIG. 4B where a check is made to determine if the thread has ceased operation, i.e. is expired, per step 420. If the thread is expired, CPU usage data for the thread is determined per step 424. The CPU usage for the thread is added to CPU usages associated with any other threads for the particular agent operating in system 102 per step 425. In contrast, if the thread is not expired in step 420, the method returns to the input of step 420.

After step 425, a check is made to determine if the agent is expired per step 426. If the agent is expired, a total CPU time for the agent is computed per step 428. In contrast, if the agent is not expired, the method iterates back to the input of step 414 (FIG. 2A) per step 426 and determines if the agent has created a thread. In an alternative embodiment, not shown in FIG. 2B, a programmable delay interval can be imposed before determining if the agent has created a thread in step 414. Furthermore, the amount of CPU usage for the thread may be incrementally updated and stored in connection with the path returning to step 414.

After step 428, CPU time for the agent is stored in the hash table per step 430. Filtering criteria is then defined per step 432. The method of FIG. 4B continues in FIG. 4C where agents are filtered to remove unwanted information per step 434. After filtering, agents are rank ordered according to user defined criteria per step 436. In a preferred embodiment, the top 100 agents, without limitation, are ranked according to consumed CPU time; however, other criteria may be employed without departing from the spirit of the invention. Corrective measures are determined for agents exceeding criteria specified in step 436 per step 438. Corrective measures, or actions, as used in accordance with embodiments of the invention, can take many forms such as, for example, but without limitation, terminating agents exceeding the set criteria, lowering priorities associated with less important agents operating in the system so a desired agent can continue to consume excessive CPU resources, and shifting agents from one CPU to another in environments containing parallel processors. In addition, corrective actions may be implemented automatically by the system and/or may be user defined. Corrective actions are then reported to a system administrator using system manager UI 118 per step 440.

Figure 4:
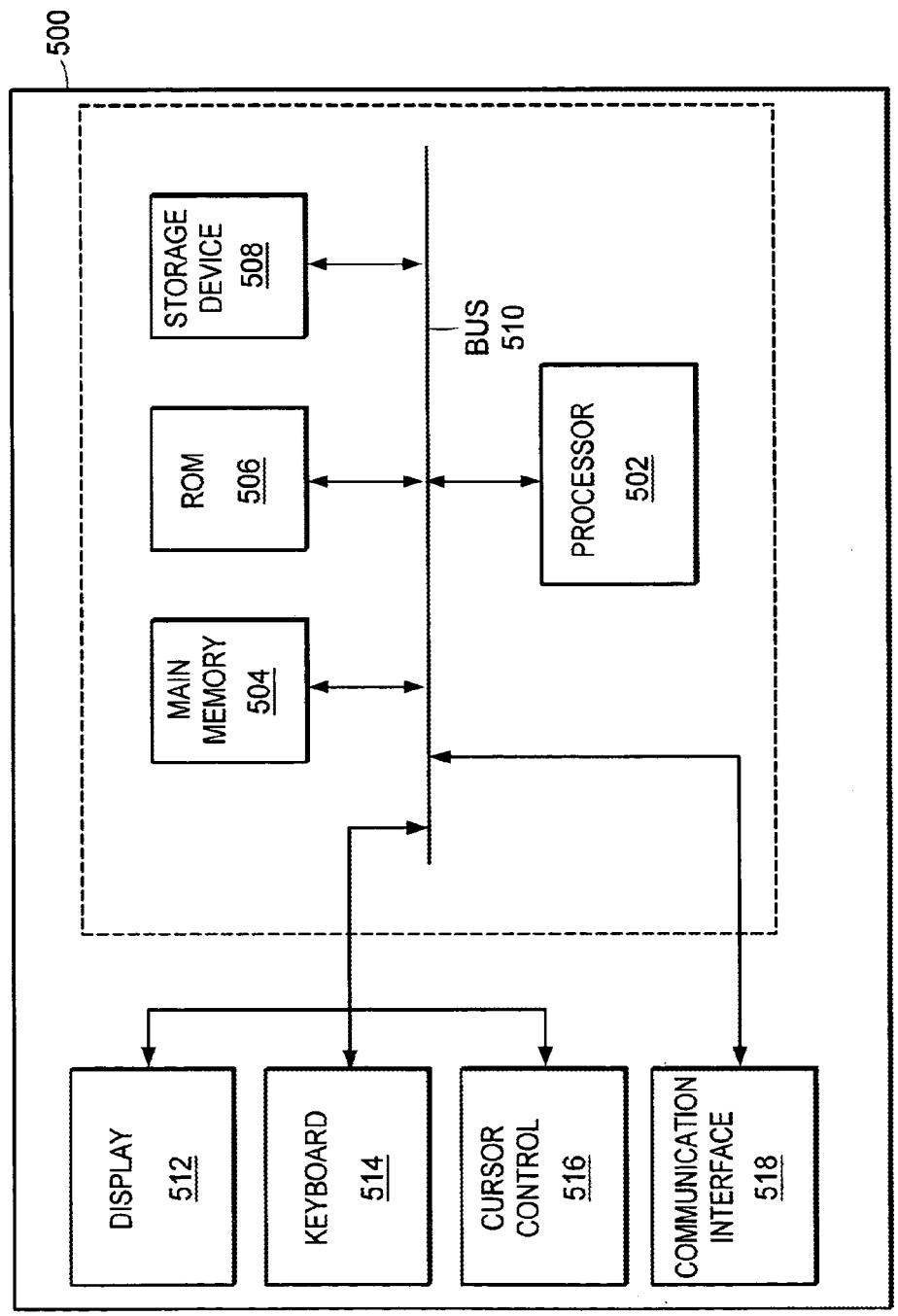
FIG. 4 illustrates an exemplary architecture for a general-purpose computer capable of implementing aspects of the invention in accordance with a preferred embodiment of the present invention.

FIG. 4 illustrates an exemplary general-purpose computer architecture useful for practicing embodiments of the invention. General-purpose computer 500 may be comprised of a processor 502, main memory 504, read only memory (ROM) 506, storage device 508, bus 510, display 512, keyboard 514, cursor control 516, and communication interface 518. Processor 502 may be any type of conventional processing device that interprets and executes instructions. The processor may include an operating system, as well as application and communication software to implement desired functions. Main memory 504 may be a random access memory (RAM) or a similar dynamic storage device. Main memory 504 stores information and instructions in machine-readable form for execution by processor 502. Main memory 504 may also be used for storing temporary variables or other intermediate information during execution of instructions by processor 502. ROM 506 stores static information and instructions for processor 502. It will be appreciated, that ROM 506 may be replaced with other types of static storage devices such as programmable ROM, erasable programmable ROM, and the like. Data storage device 508 may include any type of magnetic or optical media and its corresponding interfaces and operational hardware. Data storage device 508 stores information and instructions for use by processor 502. Bus 510 includes a set of hardware lines (conductors, optical fibers, or the like) that allow for data transfer among the components of computer 500.

Display device 512 may be a cathode ray tube (CRT), liquid crystal display (LCD), or the like, for displaying information to a user. Keyboard 514 and cursor control 516 allow the user to interact with computer 500. Cursor control 516 may be, for example, a mouse. In an alternative configuration, keyboard 514 and cursor control 516 can be replaced with a microphone and voice recognition means to enable the user to interact with computer 500.

Communication interface 518 enables computer 500 to communicate with other devices/systems via any communications medium. For example, communication interface 518 may be a modem, an Ethernet interface to an IP network, or a printer interface. Alternatively, communication interface 518 can be any other interface that enables communication between computer 500 and other devices or systems.

By way of example, a computer 500 consistent with the present invention provides a management computing system 102 with the ability to monitor scheduled and running agents on remote sites 122A and 122B via network 106. Computer 500 performs operations necessary to complete desired actions, such as computing a total CPU time for an agent and storing it in a hash tube as shown in FIG. 4B, in response to processor 502 executing sequences of instructions contained in, for example, memory 504. Such instructions may be read into memory 504 from another computer-readable medium, such as a data storage device 508, or from another device (not shown) via communication interface 518. Alternatively, hard-wired circuitry may be used in place of or in combination with software instructions to implement the present invention. Thus, the present invention is not limited to any specific combination of hardware circuitry and software.

FIGS. 5A-5C illustrate exemplary computer-readable data structures, or records, useful for storing information associated with monitoring memory and CPU resources consumed by software agents and threads associated therewith. In FIG. 6A, Agent data structure 600 is comprised of an agent ID field 602, a thread presence 604, a start time field 606, an end time field 608, a status field 612, a severity field 614, and a resolution field 616. Agent ID field 602 may contain information useful for uniquely identifying agents. In an embodiment of the invention, agents may be identified using a unique number. Data presented in agent data structure 600 may be arranged using any of the fields; however, in most instances agents will be ordered by agent number or by their adverse impact on management application 100. For example, agent 010 of FIG. 5A may be the agent consuming the greatest amount of CPU time and agent 001 may consume the least amount of CPU time.

Thread presence 604 may be a flag denoting the existence of threads other than the main thread associated with an agent.

A value for thread presence may reference another data structure such as a thread list data structure for storing additional information.

Start time field 606 and end time field 608 may contain the start time and completion time for a given agent, respectively. Status field 612 may contain information about the current status of an agent. For example, status field 612 may contain a flag where the value of the flag indicates whether the agent is currently alive or expired.

Alternatively, status field 612 may contain color codes such as red for an agent greatly exceeding an allocated system resource, such as a memory budget, yellow for an agent that is beginning to exceed a memory budget, and green for agents operating within a memory budget.

Severity field 614 may contain a text field providing possible reasons why an agent is exceeding a memory or CPU time budget. For example, severity field 614 may indicate to a system administrator that a particular agent is currently executing in an infinite loop and that manually terminating the agent is the only way to release CPU resources being utilized. Resolution field 616 may contain instructions for instructing a system operator on how to terminate a problematic agent.

Additional fields may be added to the data structure of FIG. 5A without departing from the spirit of the invention. For example, fields for CPU time and memory usage may be added. Furthermore, data structures associated with FIG. 5A may be distributed across multiple memory devices, geographic locations, etc. depending on particular implementations of enterprise management application 100.

FIG. 5B illustrates an exemplary data structure useful for storing information about threads associated with an agent operating in connection with management application 100. Thread data structure 621 may be comprised of an agent identification field 622, a thread ID field 624, and a peak usage field 626.

Agent identification field 622 may identify an agent having threads identified in thread ID field 624 associated therewith. Thread ID field 624 may contain information uniquely identifying each thread associated with a given agent. Threads included in thread ID list may make up a thread list or a thread group list.

Thread data structure 621 is exemplary in nature and can be modified depending on the needs of the management application 100. Peak usage field 626 may indicate the amount of memory consumed by particular threads during their respective lifetimes. FIG. 5C illustrates a CPU time data structure 623 useful for storing operating information associated with threads. CPU time data structure contains agent identifier field 622, thread identifier field 624, and CPU cycles used field 628. Agent identifier field 622 identifies the agent having the threads denoted in the thread identifier field 624. CPU cycles used field 628 provides the number of CPU cycles consumed by a given thread. CPU cycles used field 628 may contain a raw count indicating the number of CPU cycles consumed by a given thread, or it may provide a time value or percentage of total CPU resources consumed by a thread.

FIG. 6A contains an exemplary data display 700B containing a user interface for accepting user inputs for display of agent data. Action buttons 716 provide the user with one-click means for accessing common functionality such as canceling a requested action, going back to a previous screen or display, continuing in sequence to a subsequent display or disabling an agent probe. Target selector 718 provides the user with a means for selecting a target computer which is the device from which memory usage and/or CPU time data statistics will be gathered. Target computers may be denoted by a name, network address, association with a particular agent of interest, etc. Process selector 720 provides a user with a means for selecting a process to be probed. In FIG. 6A the user has predetermined choices of Agent Manager, HTTP, router or any other process capable of running an agent application or other type of machine-executable instructions, for example, servlets, webservice, and applications, however, process selector 720 can also be configured to allow a user to enter the name of any process using a keyboard, microphone, or other input means known in the art.

FIG. 6B illustrates an exemplary data display 700H containing a user interface for selecting types of agent data to be displayed. Type window 722C allows a user to select criteria for analyzing and displaying agent data, here by CPU time utilization data. In addition, the user can determine how agents are ranked when displayed to system manager UI 78.

Figure 6C:
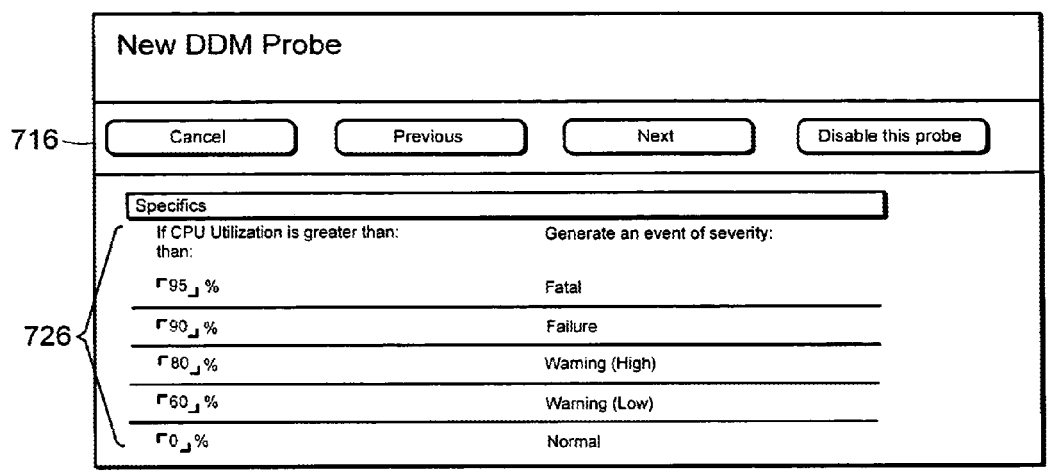

FIG. 6C illustrates an exemplary data display 700I for allowing a user to associate a severity rating with a respective percentage of CPU time utilization.

The displays shown in FIGS. 6A-6C are exemplary in nature and numerous changes can be made to thereto without departing from the spirit of the invention.

While exemplary embodiments are provided, other embodiments are possible in light of the specification. Therefore, unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems and methods. Additionally, the shapes and sizes of components are also exemplary and unless otherwise specified, can be altered without affecting the disclosed systems and methods and without departing from the spirit and scope of the invention.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above description focused on monitoring. CPU time and memory utilization associated with operating agents and their associated threads, the invention can be modified to also monitor input and output data associated with agents such as that associated with disk input/output data. And, while a series of steps have been described with regard to FIGS. 2, 3A and 3B, and 4A through 4C, the order of the steps may be varied in other implementations consistent with the present invention. Moreover, non-dependent steps may be implemented in parallel if desired.

No element, step, or instruction used in the description of the present application should be construed as critical or essential to the invention unless explicitly described as such. Also, as used herein, the article "a" is intended to include one or more items or elements. Where only one item is intended, the term "one" or similar language is used.

Many alternative embodiments of the present invention are possible in light of the teachings hereinabove. For example, in a first alternative embodiment, values displayed in agent ID 706, of display 700A, may be comprised of links that when clicked on open a new window containing detailed information about the agent. The detailed information can contain parameters associated with the agent, actual source code associated with the agent, security settings and permissions associated with the agent, etc. In addition, clicking on the link may further open a source code debugger to let the user begin debugging the source code associated with a particular problematic agent.

In a second alternative embodiment, the methods of FIGS. 2A, 3A and 3B, and 4A-4C can be modified so that only agents developed by a certain programmer are identified and monitored before reporting results back to only that programmer. Implementing this embodiment of the invention may be useful to programmers in that they can assess the impact of their code on the system, thus making before and after benchmarking possible with respect to newly developed agents.

The scope of the invention is defined by the claims and equivalents thereof hereinbelow.

The claims should not be read as limited to the described order or elements unless stated to that effect. Therefore, all embodiments that come within the scope and spirit of the following claims and equivalents thereto are claimed as the invention.

What is claimed:

1. A method for monitoring system processor resources utilized by a software agent operating in a computer system, wherein said agent comprises an executable sequence of instructions, comprising:
    identifying said agent, wherein said identifying is performed by a CPU resource tracking process determining that said agent is running;
    associating, by said CPU resource tracking process responsive to said identifying of said agent, an agent identifier with said agent, wherein said agent is one of a plurality of software agents operating in said computer system, and wherein said agent identifier uniquely identifies said agent within said plurality of software agents operating in said computer system;
    initiating, responsive to said identifying of said agent, an agent lifetime timer for measuring an operating interval of said agent during which said agent is running in said computer system;
    determining said operating interval using said agent lifetime timer by identifying a start time at which said CPU resource tracking process determined that said agent is running and a completion time at which said CPU resource tracking process determines that said agent has expired, and computing said operating interval as the difference between said starting time and said completion time;
    calculating an amount of said system processor resources utilized by said agent during said operating interval at least in part by detecting a plurality of threads created by said agent during said operating interval, wherein said calculating said amount of said system processor resources utilized by said agent during said operational interval further includes calculating CPU usage for each of said plurality of threads and adding said calculated CPU usage for all of said plurality of threads together to determine at least a portion of said amount of system processor resources utilized by said agent during said operating interval, wherein said calculating said CPU usage for each of said plurality of threads is performed responsive to each respective one of said plurality of threads expiring, and wherein said adding said calculated CPU usage for all of said plurality of threads together is performed by adding said calculated CPU utilization for each respective one of said plurality of threads responsive to each respective one of said plurality of threads expiring, wherein each of said plurality of threads is a path of execution such that multiple of said plurality of threads can be executed simultaneously; and
    storing said operating interval, said amount of system processor resources utilized by said agent during said operating interval and said agent identifier in a computer-readable memory.

2. The method of claim 1, wherein said computer-readable memory includes a hash table.

3. The method of claim 1 further comprising:
    associating said operating interval and said agent identifier with other operating intervals and agent identifiers associated with other ones of said plurality of software agents operating in said computer system.

4. The method of claim 3 further comprising:
    filtering said plurality of software agents according to predefined filtering criteria to produce a filtered set.

5. The method of claim 4 further comprising:
    rank ordering said filtered set.

6. The method of claim 5 further comprising:
    making said filtered set available to a display device.

7. The method of claim 4 further comprising:
    determining a corrective measure for at least one member of said filtered set having an amount of system processor resources utilized that exceeds a predetermined threshold.

8. The method of claim 7 further comprising:
    displaying said corrective measure on a display device.

9. The method of claim 7, wherein said corrective measure is implemented by said system.

10. The method of claim 1, further comprising:
    running a collection probe to determine if a total amount of consumed system processor resources exceeds a predetermined threshold; and
    performing said initiating step when said total amount of consumed system processor resources exceeds said configuration threshold.

11. The method of claim 1, wherein said agent comprises a web based event driven agent, and wherein said agent identifier comprises a name and an HTTP (HyperText Transport Protocol) thread identifier.

12. The method of claim 1 further comprising:
    computing statistics for said plurality of threads.

13. The method of claim 12 further comprising:
    rank ordering said plurality of threads.

14. The method of claim 13 further comprising:
    providing said plurality of threads a display device.

15. A computer system including a computer readable storage device having program code executable by a processor stored thereon, for monitoring system processor resources utilized by a software agent operating in said computer system, wherein said agent comprises an executable sequence of instructions, said program code comprising:
    program code for identifying said agent, wherein said identifying is performed by a CPU resource tracking process determining that said agent is running;
    program code for associating, by said CPU resource tracking process responsive to said identifying of said agent, an agent identifier with said agent, wherein said agent is one of a plurality of software agents operating in said computer system, and wherein said agent identifier uniquely identifies said agent within said plurality of software agents operating in said computer system;
    program code for initiating, responsive to said identifying of said agent, an agent lifetime timer for measuring an operating interval of said agent during which said agent is running in said computer system;
    program code for determining said operating interval using said agent lifetime timer by identifying a start time at which said CPU resource tracking process determined that said agent is running and a completion time at which said CPU resource tracking process determines that said agent has expired, and computing said operating interval as the difference between said starting time and said completion time;

program code for calculating an amount of said system processor resources utilized by said agent during said operating interval at least in part by detecting a plurality of threads created by said agent during said operating interval, wherein said calculating said amount of said system processor resources utilized by said agent during said operational interval further includes calculating CPU usage for each of said plurality of threads and adding said calculated CPU usage for all of said plurality of threads together to determine at least a portion of said amount of system processor resources utilized by said agent during said operating interval, wherein said calculating said CPU usage for each of said plurality of threads is performed responsive to each respective one of said plurality of threads expiring, and wherein said adding said calculated CPU usage for all of said plurality of threads together is performed by adding said calculated CPU utilization for each respective one of said plurality of threads responsive to each respective one of said plurality of threads expiring, wherein each of said plurality of threads is a path of execution such that multiple of said plurality of threads can be executed simultaneously; and program code for storing said operating interval, said amount of system processor resources utilized by said agent during said operating interval and said agent identifier in a computer-readable memory.

16. The system of claim 15, wherein said computer-readable memory includes a hash table.

17. The system of claim 15, said program code further comprising:

program code for associating said operating interval and said agent identifier with other operating intervals and agent identifiers associated with other ones of said plurality of software agents operating in said computer system.

18. The system of claim 17, said program code further comprising:

program code for filtering said plurality of software agents according to predefined filtering criteria to produce a filtered set.

19. The system of claim 18, said program code further comprising:

program code for rank ordering said filtered set.

20. The system of claim 19, said program code further comprising:

program code for making said filtered set available to a display device.

21. The system of claim 18, said program code further comprising:

program code for determining a corrective measure for at least one member of said filtered set having an amount of system processor resources utilized that exceeds a predetermined threshold.

22. The system of claim 21, said program code further comprising:

program code for displaying said corrective measure on a display device.

23. The system of claim 21, wherein said corrective measure is implemented by said system.

24. The system of claim 15, said program code further comprising:

program code for running a collection probe to determine if a total amount of consumed system processor resources exceeds a predetermined threshold; and program code for performing said initiating step when said total amount of consumed system processor resources exceeds said configuration threshold.

25. A computer program product, comprising:

a computer readable storage device having program code executable by a processor stored thereon, for monitoring system processor resources utilized by a software agent operating in said computer system, wherein said agent comprises an executable sequence of instructions, said program code comprising:

program code for identifying said agent, wherein said identifying is performed by a CPU resource tracking process determining that said agent is running;

program code for associating, by said CPU resource tracking process responsive to said identifying of said agent, an agent identifier with said agent, wherein said agent is one of a plurality of software agents operating in said computer system, and wherein said agent identifier uniquely identifies said agent within said plurality of software agents operating in said computer system;

program code for initiating, responsive to said identifying of said agent, an agent lifetime timer for measuring an operating interval of said agent during which said agent is running in said computer system;

program code for determining said operating interval using said agent lifetime timer by identifying a start time at which said CPU resource tracking process determined that said agent is running and a completion time at which said CPU resource tracking process determines that said agent has expired, and computing said operating interval as the difference between said starting time and said completion time;

program code for calculating an amount of said system processor resources utilized by said agent during said operating interval at least in part by detecting a plurality of threads created by said agent during said operating interval, wherein said calculating said amount of said system processor resources utilized by said agent during said operational interval further includes calculating CPU usage for each of said plurality of threads and adding said calculated CPU usage for all of said plurality of threads together to determine at least a portion of said amount of system processor resources utilized by said agent during said operating interval, wherein said calculating said CPU usage for each of said plurality of threads is performed responsive to each respective one of said plurality of threads expiring, and wherein said adding said calculated CPU usage for all of said plurality of threads together is performed by adding said calculated CPU utilization for each respective one of said plurality of threads responsive to each respective one of said plurality of threads expiring, wherein each of said plurality of threads is a path of execution such that multiple of said plurality of threads can be executed simultaneously; and program code for storing said operating interval, said amount of system processor resources utilized by said agent during said operating interval and said agent identifier in a computer-readable memory.

* * * * *